(12) United States Patent
Inbarajan et al.

(10) Patent No.: US 8,615,355 B2
(45) Date of Patent: Dec. 24, 2013

(54) MULTIFACTOR CHARGING FOR ELECTRIC VEHICLES

(75) Inventors: Krishnaraj Inbarajan, Troy, MI (US); Vishnu Madanarajagopal, Canton, MI (US)

(73) Assignee: General Motors LLC, Detroit, MI (US)

( * ) Notice: Subject to any disclaimer, the term of this patent is extended or adjusted under 35 U.S.C. 154(b) by 615 days.

(21) Appl. No.: 12/781,394

(22) Filed: May 17, 2010

(65) Prior Publication Data

US 2011/0282527 A1 Nov. 17, 2011

(51) Int. Cl.
*B60L 9/00* (2006.01)

(52) U.S. Cl.
USPC .............................. 701/123; 701/22

(58) Field of Classification Search
USPC .................................. 701/22, 123
See application file for complete search history.

(56) References Cited

U.S. PATENT DOCUMENTS

| 6,181,991 | B1 * | 1/2001 | Kondo et al. | 701/22 |
| 8,155,867 | B2 * | 4/2012 | Krause | 701/123 |
| 8,170,737 | B2 * | 5/2012 | Tate et al. | 701/22 |
| 8,301,323 | B2 * | 10/2012 | Niwa | 701/22 |
| 8,315,788 | B2 * | 11/2012 | Surnilla et al. | 701/123 |
| 8,326,478 | B2 * | 12/2012 | Ichikawa | 701/22 |
| 2011/0022254 | A1 * | 1/2011 | Teener et al. | 701/22 |

* cited by examiner

*Primary Examiner* — Ruth Ilan
(74) *Attorney, Agent, or Firm* — Leydig, Voit & Mayer, Ltd.

(57) ABSTRACT

The described method and system improve electric-power driving range for electric vehicles, i.e., electric-only, hybrid electric, and other vehicles that draw electrical power from an on-board storage system for propulsion. The described system uses synergy among selected data sources to provide charging prompts and route assistance to allow the vehicle user to operate his or her vehicle in a more economical fashion by ensuring timely and cost effective charging.

18 Claims, 5 Drawing Sheets

MULTIFACTOR CHARGING FOR ELECTRIC VEHICLES

BACKGROUND OF THE INVENTION

Given the historically unpredictable market cost of hydrocarbon fuels, electric-only and hybrid electric vehicles have become popular as a means for providing energy security and economy. Such vehicles have other benefits including noise reduction, emission reduction, and low vibration. Despite the many advantages of electric-only and hybrid electric vehicles, electric vehicles generally have a limited driving range compared to fuel-powered vehicles due to the higher energy density of fuels compared to the relatively limited energy density of most viable electric energy storage systems, e.g., various types of batteries.

Thus, to allow a user to use the vehicle in its preferred electric propulsion mode, it is desirable to charge the vehicle energy storage system in a timely manner, while minimizing energy costs and maximizing user convenience while charging. It is an object of the invention to provide such a system in various implementations. Nonetheless, it will be appreciated that the invention is not limited to systems that solve all of the problems noted herein. Moreover, the inventors have created the above body of information for the convenience of the reader and expressly disclaim all of the foregoing as prior art; the foregoing is a discussion of problems discovered and/or appreciated by the inventors, and is not an attempt to review or catalog the prior art.

BRIEF SUMMARY OF THE INVENTION

The invention provides a system and apparatus for improving the electric-powered driving range for electric vehicles, including any vehicle that partially, predominantly, or exclusively uses electric energy for propulsion, wherein the electrical energy is at least partially drawn from an on-board storage system, and wherein the vehicle includes an interface to receive grid power for charging the on-board storage system. The onboard storage system may also be capable of being charged by an on-board power source such as an internal combustion engine (ICE) driving a generator.

The system also provides a method of charging an electric vehicle that includes presenting an electronic user interface to the vehicle user at a remote terminal, and receiving configuration information via user input to configure one or more associated user alerts. The method also obtains information regarding expected travel with the vehicle, the charge state of the vehicle battery, and the current value of the time-varying cost of electric energy to charge the vehicle, and alerts the user to charge the vehicle in accordance with this synergistic combination of information.

Other objects and advantages of the invention will become apparent upon reading the following detailed description and upon reference to the drawings.

DETAILED DESCRIPTION OF THE INVENTION

Before discussing the details of the invention and the environment wherein the invention may be used, a brief overview is given to guide the reader. In general terms, not intended to limit the claims, the invention is directed to a system and method for improving electric-powered driving range for plug-in hybrid-electric and electric vehicles, thus reducing vehicle operating costs and enhancing user convenience. In one aspect, the system identifies the best time, duration and location to charge an electric vehicle to save cost and use energy efficiently. For example, based on historical driving patterns that may be prerecorded and are used for identification, the system is able to identify the charging needs of the vehicle on-board energy storage system, identify local charging stations within proximity of vehicle, optimize times and places to charge, suggest route changes to the driver, and display information to the driver including alerts based on configured thresholds.

In a further aspect, the system is able to trigger an automatic charge management algorithm based, for example, on a determined least costly time of day to charge the vehicle. In another aspect, the system is enabled to deliver information to the user through multiple channels and to allow the user to locally or remotely initiate actions based on alerts.

The system allows the user to operate his or her vehicle in a more economical fashion by ensuring timely and cost effective charging, and by allowing the user to more readily appreciate the operating cost differential between different proportions of electric-only use. The user is also assisted in locating charging stations.

In a further aspect, the system leverages data associated with a drivers' electronic calendar, and combines this data with information regarding charging station locations, charging history/behavior, communication capability associated with the vehicle (either wired or wireless) and other enablers to ensure that there is enough charge to drive the vehicle on its next trip. In this aspect, an algorithm combines data regarding driving habits with data from the driver's electronic calendar to create a pattern for the electric vehicle. On a given driving day, based on driving history and input from the electronic calendar a record is created reflecting the expected amount of time before the next drive, when the next drive is to occur, the optimal charging time, how long the drive would be before being near a charging station, and so on. Because it is based on data that it specific to the driver and accounts for the capabilities of the vehicle, such records are unique to the driver and the vehicle.

In another aspect, geo-coding of main charging stations allows for a trigger to be set within the vehicle when the vehicle comes within a predetermined proximity of a certain charging station (home, office, etc.). At this time, the system determines if the current time approximately matches a time that the vehicle has historically been charged. If the location and time match, then the driver's electronic calendar may be queried for the next driving event, and the location of the destination and duration of the drive are determined. The resulting information is matched against the amount of charge left in the vehicle's on-board energy storage system to compute the time for recharging the system.

Combining these abilities allows the system to notify the driver if the vehicle will be ready for the expected next drive, and if not, to ensure that the vehicle becomes ready. If the driver has chosen to recharge when it's cheaper to do so, the recharging may start earlier to allow for complete recharge. In some cases, there will not be sufficient time to charge the vehicle to the necessary level, and in such a case, the customer is sent an alert so that they are aware that there will be insufficient charge to complete the drive on electric power alone.

Figure 1:
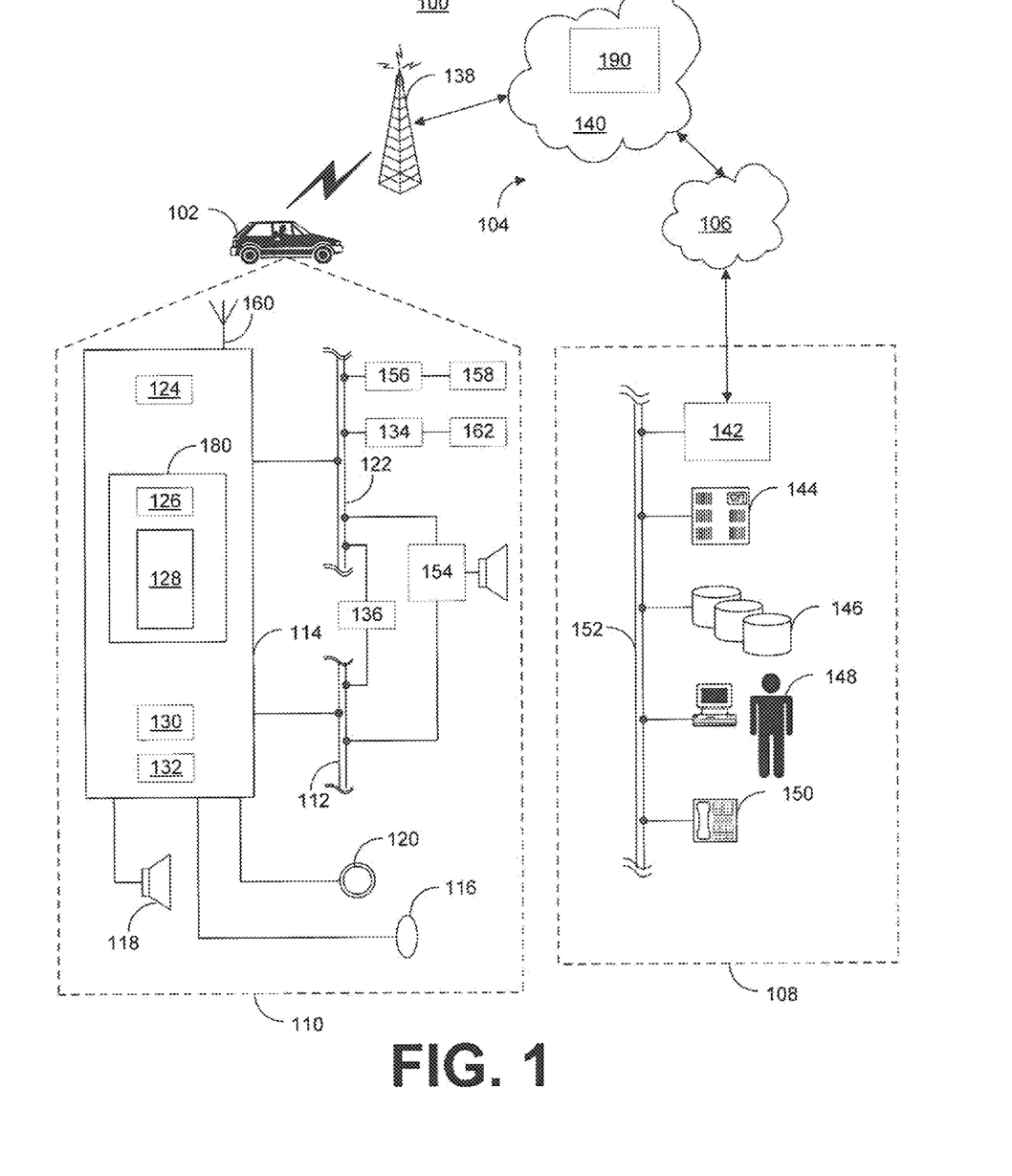
FIG. 1 is a schematic diagram of an operating environment for a mobile vehicle communication system usable in implementations of the described principles.

Given this overview, an exemplary environment in which the invention may operate is described hereinafter. It will be appreciated that the described environment is an example, and does not imply any limitation regarding the use of other environments to practice the invention. With reference to FIG. 1 there is shown an example of a communication system 100 that may be used with the present method and generally includes a vehicle 102, a wireless carrier system 104, a land network 106 and a call center 108. It should be appreciated that the overall architecture, setup and operation, as well as the individual components of a system such as that shown here are generally known in the art. Thus, the following paragraphs simply provide a brief overview of one such exemplary information system 100; however, other systems not shown here could employ the present method as well.

Vehicle 102 is preferably a mobile vehicle such as a motorcycle, car, truck, recreational vehicle (RV), boat, plane, etc., and is equipped with suitable hardware and software that enables it to communicate over system 100. Some of the vehicle hardware 110 is shown generally in FIG. 1 including a telematics unit 114, a microphone 116, a speaker 118 and buttons and/or controls 120 connected to the telematics unit 114. Operatively coupled to the telematics unit 114 is a network connection or vehicle bus 122. Examples of suitable network connections include a controller area network (CAN), a media oriented system transfer (MOST), a local interconnection network (LIN), an Ethernet, and other appropriate connections such as those that conform with known ISO, SAE, and IEEE standards and specifications, to name a few.

The telematics unit 114 is an onboard device that provides a variety of services through its communication with the call center 108, and generally includes an electronic processing device 128 one or more types of electronic memory 130, a cellular chipset/component 124, a wireless modem 126, a dual antenna 160 and a navigation unit containing a GPS chipset/component 132. In one example, the wireless modem 126 is comprised of a computer program and/or set of software routines executing within processing device 128. The cellular chipset/component 124 and the wireless modem 126 may be called the network access device (NAD) 180 of the telematics unit 114.

The telematics unit 114 provides too many services to list them all, but several examples include: turn-by-turn directions and other navigation-related services provided in conjunction with the GPS based chipset/component 132; airbag deployment notification and other emergency or roadside assistance-related services provided in connection with various crash and or collision sensor interface modules 156 and sensors 158 located throughout the vehicle. Infotainment-related services where music, Web pages, movies, television programs, video games and/or other content is downloaded by an infotainment center 136 operatively connected to the telematics unit 114 via vehicle bus 122 and audio bus 112. In one example, downloaded content is stored for current or later playback.

Again, the above-listed services are by no means an exhaustive list of all the capabilities of telematics unit 114, as should be appreciated by those skilled in the art, but are simply an illustration of some of the services that the telematics unit 114 is capable of offering. It is anticipated that telematics unit 114 include a number of known components in addition to those listed above.

Vehicle communications preferably use radio transmissions to establish a voice channel with wireless carrier system 104 so that both voice and data transmissions can be sent and received over the voice channel. Vehicle communications are enabled via the cellular chipset/component 124 for voice communications and a wireless modem 126 for data transmission. In order to enable successful data transmission over the voice channel, wireless modem 126 applies some type of encoding or modulation to convert the digital data so that it can communicate through a vocoder or speech codec incorporated in the cellular chipset/component 124. Any suitable encoding or modulation technique that provides an acceptable data rate and bit error can be used with the present method. Dual mode antenna 160 services the GPS chipset/component and the cellular chipset/component.

Microphone 116 provides the driver or other vehicle occupant with a means for inputting verbal or other auditory commands, and can be equipped with an embedded voice processing unit utilizing a human/machine interface (HMI) technology known in the art. Conversely, speaker 118 provides verbal output to the vehicle occupants and can be either a stand-alone speaker specifically dedicated for use with the telematics unit 114 or can be part of a vehicle audio component 154. In either event, microphone 116 and speaker 118 enable vehicle hardware 110 and call center 108 to communicate with the occupants through audible speech. The vehicle hardware also includes one or more buttons or controls 120 for enabling a vehicle occupant to activate or engage one or more of the vehicle hardware components 110. For example, one of the buttons 120 can be an electronic push button used to initiate voice communication with call center 108 (whether it be a live advisor 148 or an automated call response system). In another example, one of the buttons 120 can be used to initiate emergency services.

The audio component 154 is operatively connected to the vehicle bus 122 and the audio bus 112. The audio component 154 receives analog information, rendering it as sound, via the audio bus 112. Digital information is received via the vehicle bus 122. The audio component 154 provides AM and FM radio, CD, DVD, and multimedia functionality independent of the infotainment center 136. Audio component 154 may contain a speaker system, or may utilize speaker 118 via arbitration on vehicle bus 122 and/or audio bus 112.

The vehicle crash and/or collision detection sensor interface 156 are operatively connected to the vehicle bus 122. The crash sensors 158 provide information to the telematics unit 114 via the crash and/or collision detection sensor interface 156 regarding the severity of a vehicle collision, such as the angle of impact and the amount of force sustained.

Vehicle sensors 162, connected to various sensor interface modules 134 are operatively connected to the vehicle bus 122. Example vehicle sensors include but are not limited to gyroscopes, accelerometers, magnetometers, emission detection and/or control sensors, and the like. Example sensor interface modules 134 include power train control, climate control, and body control, to name but a few.

Wireless carrier system 104 is preferably a cellular telephone system or any other suitable wireless system that transmits signals between the vehicle hardware 110 and land network 106. According to an example, wireless carrier system 104 includes one or more cell towers 138, base stations and/or mobile switching centers (MSCs) 140, as well as any other networking components required to connect the wireless system 104 with land network 106. A component in the mobile switching center may include a remote data server 180. As appreciated by those skilled in the art, various cell tower/base station/MSC arrangements are possible and could be used with wireless system 104. For example, a base station and a cell tower could be co-located at the same site or they could be remotely located, and a single base station could be coupled to various cell towers or various base stations could be coupled with a single MSC, to but a few of the possible arrangements. Preferably, a speech codec or vocoder is incorporated in one or more of the base stations, but depending on the particular architecture of the wireless network, it could be incorporated within a Mobile Switching Center or some other network components as well.

Land network 106 can be a conventional land-based telecommunications network that is connected to one or more landline telephones and connects wireless carrier network 104 to call center 108. For example, land network 106 can include a public switched telephone network (PSTN) and/or an Internet protocol (IP) network, as is appreciated by those skilled in the art. Of course, one or more segments of the land network 106 can be implemented in the form of a standard wired network, a fiber or other optical network, a cable network, other wireless networks such as wireless local networks (WLANs) or networks providing broadband wireless access (BWA), or any combination thereof.

Call Center (OCC) 108 is designed to provide the vehicle hardware 110 with a number of different system back-end functions and, according to the example shown here, generally includes one or more switches 142, servers 144, databases 146, live advisors 148, as well as a variety of other telecommunication and computer equipment 150 that is known to those skilled in the art. These various call center components are preferably coupled to one another via a network connection or bus 152, such as the one previously described in connection with the vehicle hardware 110. Switch 142, which can be a private branch exchange (PBX) switch, routes incoming signals so that voice transmissions are usually sent to either the live advisor 148 or an automated response system, and data transmissions are passed on to a modem or other piece of equipment 150 for demodulation and further signal processing.

The modem 150 preferably includes an encoder, as previously explained, and can be connected to various devices such as a server 144 and database 146. For example, database 146 could be designed to store subscriber profile records, subscriber behavioral patterns, or any other pertinent subscriber information. Although the illustrated example has been described as it would be used in conjunction with a manned call center 108, it will be appreciated that the call center 108 can be any central or remote facility, manned or unmanned, mobile or fixed, to or from which it is desirable to exchange voice and data.

Figure 2:
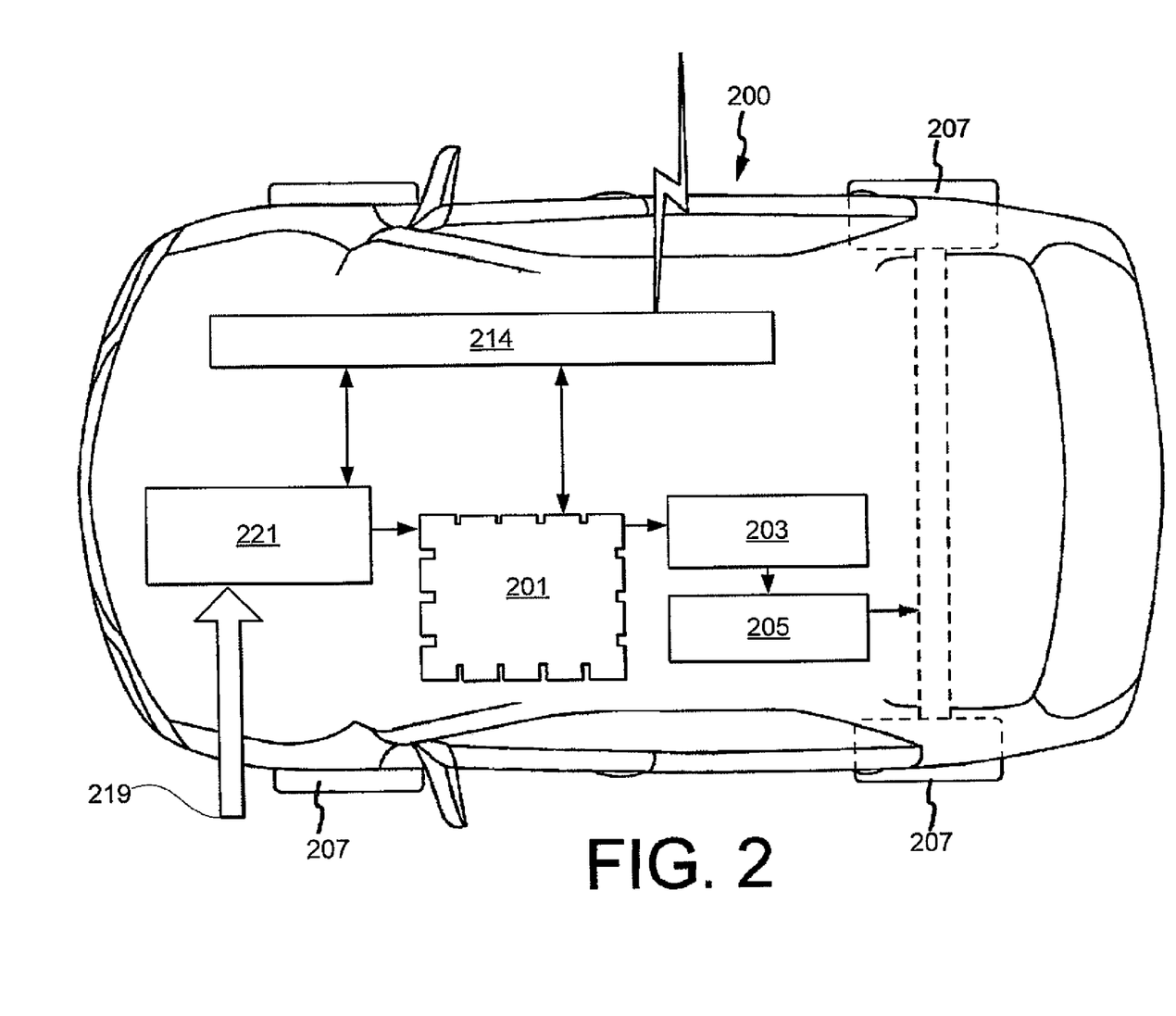
FIG. 2 is a schematic vehicle diagram showing relevant power systems and communications linkages within the vehicle and between the vehicle and a remote entity.

As noted above, the telematics unit 114 and associated components are associated in an implementation of the invention with a vehicle 102. In particular, the vehicle 102 is a plug-in hybrid-electric or electric vehicle. FIG. 2 is a vehicle schematic showing the components of the vehicle of interest with the respect to the disclosed principles and the manner in which the components may be interrelated to execute those principles. It will be appreciated, however, that the illustrated architecture is merely an example, and that the disclosed principles do not require that the vehicle be configured precisely as shown.

In the illustrated example, the vehicle 200 (102) includes an electrical energy storage system 201, e.g., a battery of suitable voltage and capacity. The electrical energy storage system 201 is conductively linkable, e.g., via a controller 203, to an electrical drive unit 205, e.g., an electrical motor or motors. The electrical energy may be modulated, voltage-modified, or otherwise modified by the controller 203 as needed to drive the electrical drive unit 205. The electrical drive unit 205 is linked or linkable to a ground engaging drive, typically including one or more wheels 207. In order to charge the electrical energy storage system 201, a plug interface 219 is provided. The plug interface 219 is linked to the electrical energy storage system 201 via a charge controller 221. The telematics unit 214 (114) is adapted to receive information from a remote source as discussed above to convey data regarding vehicle systems and to facilitate alerts when appropriate.

As noted above, the invention is directed to a system and method for improving electric-power driving range for plug-in hybrid-electric and electric vehicles, thus reducing vehicle operating costs, lowering vehicle-based carbon emissions, and enhancing user convenience. The system creates a synergy of data sources by combining information from numerous disparate sources to provide services that would not be possible with any one source.

In one aspect, the system identifies the best time, duration and location to charge an electric vehicle to save cost and use energy efficiently. For example, based on historical driving patterns that may be prerecorded and are used for identification, the system is able to identify the charging needs of the vehicle on-board energy storage system, identify local charging stations near vehicle, optimize times and places to charge in real time, suggest route changes to the driver, and display information to the driver including alerts based on configured thresholds. The needs of the vehicle, the schedule of to user, the locations of charging facilities and the time-varying cost of electricity are combined in one aspect to provide the user with the lowest cost and most environmentally sound experience available with their vehicle.

Figure 3:
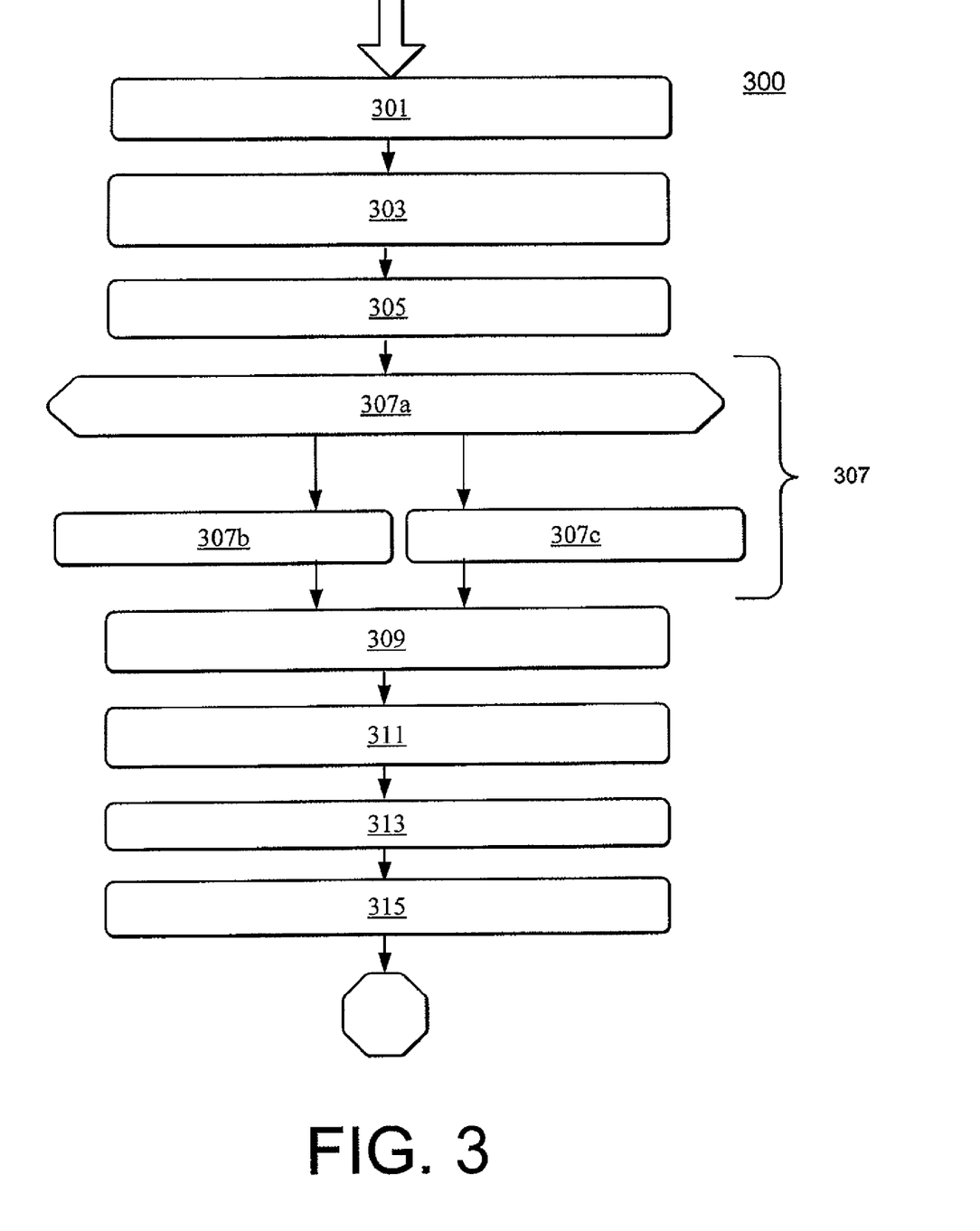
FIG. 3 is a flowchart illustrating a process of recharge optimization based on data source synergy.

FIG. 3 shows a process of recharge optimization based on data source synergy. The process 300 may run locally or remotely from the vehicle 200, e.g., in the vehicle telematics unit 114 or associated hardware, or at a remote server connected wirelessly to the telematics unit 114. The process 300 may be run on a regular interval or may be triggered by a battery charge threshold, e.g., if the charge is below 90% of capacity, the process runs. Further, it will be appreciated that data collection operations relative to vehicle parameters such as location, charge state, etc., are taken locally, and may either be processed locally or transmitted to a remote entity, e.g., a server, for processing. Thus, while the following description is given in the context of local processing, it will be appreciated that the same principles apply to remote processing.

At stage 301 of the process 300, the telematics unit accesses prerecorded historical driving patterns. The telematics unit identifies likely travel patterns within a forward looking time window at stage 303. The duration of the time window is not critical, but in one aspect, the time window may be 24 hours. Having identified likely upcoming travel based on prediction, the process 300 moves to stage 305, wherein the telematics unit accesses the user's calendar to identify upcoming travel. After comparing the travel estimate based on historical patterns and the travel estimate based on the user's calendar at stage 307, if the calendar indicates travel, then the estimate based on the calendar is used for subsequent processing, whereas if the calendar does not indicate travel, then the estimate based on historical patterns is used.

Moving to stage 309, the relevant data selected in stage 307 is processed to provide an estimate of vehicle charge needs. In particular, the distance and driving type associated with the estimated route are calculated and are used identify the charging needs of the vehicle on-board energy storage system. For example, rough roads and roads having frequent stops and starts will require more energy per distance traveled.

If the estimated travel will include an overnight stay or all day stay, i.e., a stop on a trip or a stop at the user's place of work during working hours, the system may take this into account at stage 311 to identify charging opportunities and associated locations. The system may also suggest minor route changes to provide charging opportunities. For example, if a user usually parks at his or her office and there is no known charging facility at that location, the system may suggest that the user instead park at a location a block away that does have a charging facility. Similarly, if the upcoming travel is a two day trip to reach a distant destination, the system may suggest a route modification such that the overnight stop occurs at a known charging facility.

Finally, the system may modify the instructions to the driver based on the time-varying cost of electricity from the grid at stage 313. For example, if the expected trip is a round-trip to the user's place of work, with one leg in the morning and one leg in the evening, and electricity from the grid costs less per kilowatthour during nonworking hours, the system may advise the user to fully charge the vehicle at home to support a full round trip even though the user would have been able to charge the vehicle at the workplace after the first leg of the round trip.

At stage 315, the process conveys to the user a user instruction set having instructions for charging times and driving routes where appropriate. The instructions may be conveyed to the user in the vehicle by audio means such as via vehicle speakers or by visual means such as on a telematics or heads-up display. The instructions may additionally or alternatively be provided to the user remotely by being transmitted from the telematics unit over the wireless network to a wireless device associated with the user, such as a cell phone, personal data device, laptop computer, desktop computer, etc. In this way, data regarding the needs of the vehicle, the schedule of the user, the locations of charging facilities and the time-varying cost of electricity are combined to provide the user with a low cost and environmentally sound experience with their vehicle.

In a further aspect of the described innovation, a user is able to configure and receive alert messages triggered through user-set thresholds. For example, a user that operates their vehicle primarily within a city that has a diameter of roughly 20 miles may wish to ensure that their vehicle on-board energy storage system is charged any time that its charge state will only support a lesser distance and the vehicle is near a known charging facility, regardless of cost and regardless of historically predicted or planned driving activities.

Figure 4:
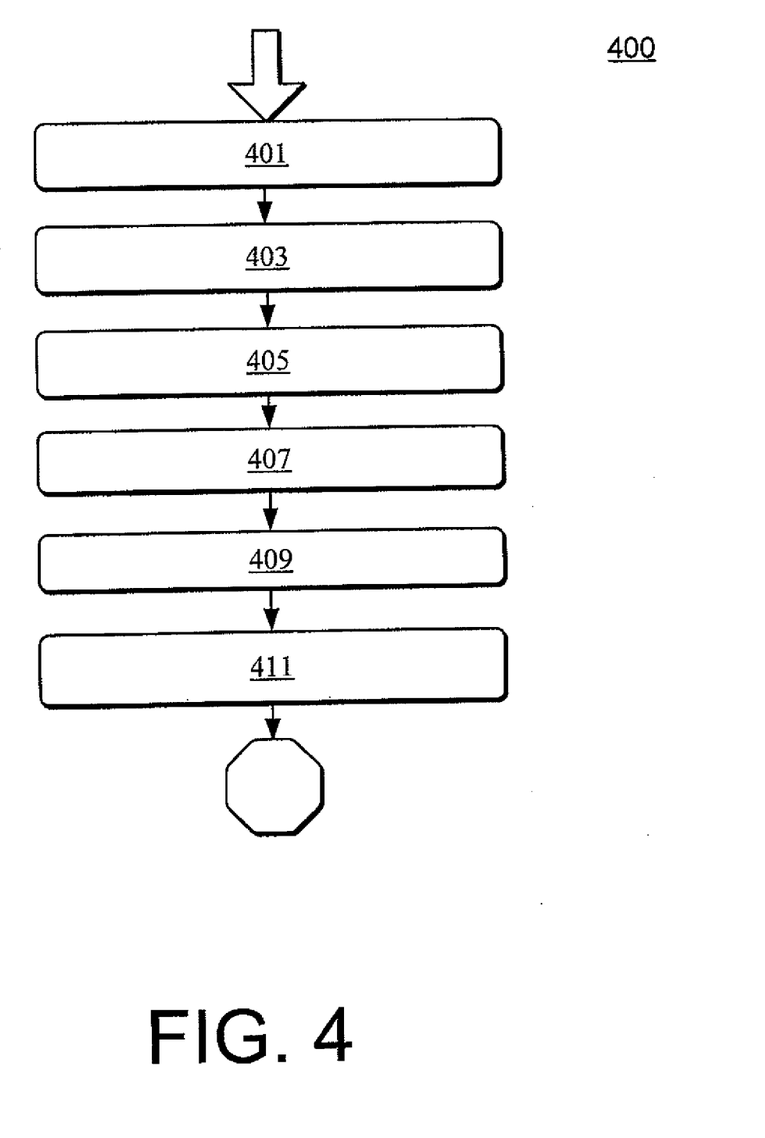
FIG. 4 is a flowchart illustrating a process for establishing and utilizing user alerts to allow for a more controlled user experience in an aspect of the described principles.

FIG. 4 illustrates a process 400 for establishing and utilizing user alerts to allow for a more controlled user experience. The process 400 may be executed locally to the vehicle, e.g., through a user interface associated with an in-vehicle navigation set or telematics unit, or may be executed remotely, e.g., via a user interface associated with a remote device accessible to the user. In addition, regardless of where the user input occurs, the output of the process to the user may occur locally (e.g., at the in-vehicle display), remotely (e.g., at the user's remote device), or both.

At the outset of the process 400 at stage 401, a user display is provided to the user via a configuration application running preferably at the location at which the user display is rendered although it is contemplated that the application may run remotely from the site of user input as well. In an aspect, the user display is in accordance with the exemplary configuration 500 shown in FIG. 5, which will be discussed later.

Continuing with the process 400, the user selects a vehicle to configure at stage 403 to begin the user input portion of the configuration process. For example, the user may select one of several electric vehicles owned by the user, with configuration of all vehicles carried out by sequentially iterating through the process 400. Having selected the vehicle for configuration, the user then optionally activates and selects parameters for a proximity alert at stage 405, i.e., an alert that informs the user of the presence of a nearby charging station. The selected parameter may be a proximity within which the user would like to be notified. If the user has activated the proximity alert at stage 403, the user may optionally configure the proximity distance to scale with remaining charge capacity at stage 407, so that the system will more liberally recommend charge sites as the need for charging increases.

At stage 409, the user may elect, via the user interface, to activate one or more capacity alerts, i.e., alerts that notify the user when the vehicle battery capacity has diminished below a user-set threshold. At this point, the user may indicate completion of the configuration at stage 411 whereupon the input selections and parameters are stored for use by the alerting application. The values may be stored remotely or locally relative to the vehicle or the user device, as long as they remain accessible to the alerting application from the platform upon which it runs.

Figure 5:
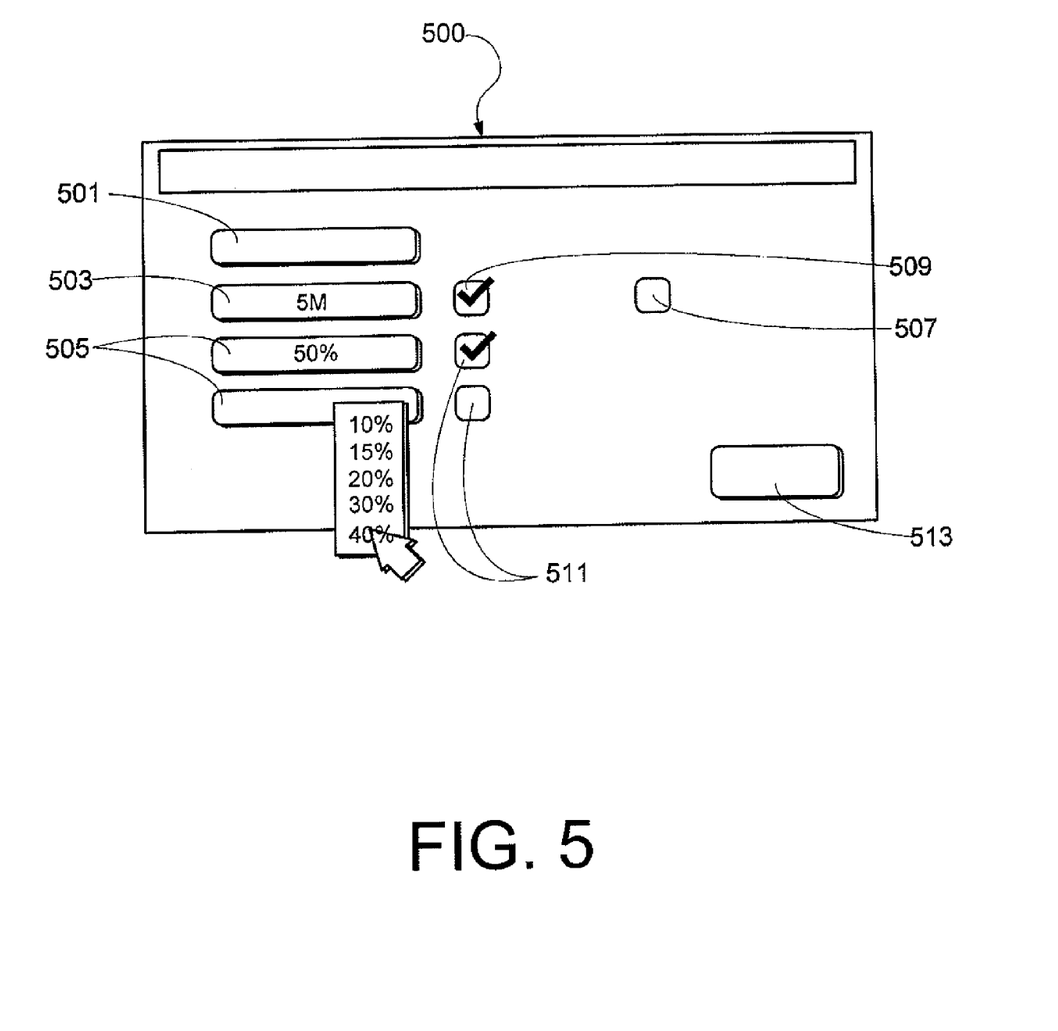
FIG. 5 is a simplified user interface view showing a user display associated with an exemplary configuration application.

The exemplary user display configuration 500 shown in FIG. 5 includes a vehicle identification field 501 to allow the user to identify the vehicle for which the configuration activity is being executed. For example, a user may have multiple vehicles, and they may serve different uses, have different capabilities, and have different charging needs.

The exemplary user interface also includes a proximity-based alert field 503 and a capacity-based alert field 505. An activation check box field 509, 511 may be associated with each to turn the associated alerting function on or off. The user employs the proximity-based alert field 503 to configure, via pull-down options or input options, one or more alerts to alert the user when the vehicle is within a predetermined proximity of a known charging station. In one aspect, the user selects the predetermined proximity and in a further aspect, the predetermined proximity scales or deactivates in relation to the charge state of the vehicle. A user-selectable check field 507 may be provided for this purpose. Thus, for example, in this aspect if the user-selectable check field 507 is selected, and if the vehicle battery is relatively fully charged, e.g., within 10% of capacity, then proximity-based alerting is suppressed.

The capacity-based alert field allows the user to select, in a similar manner, one or more alarm thresholds at which the user is prompted to recharge the battery. The prompts at the various threshold may vary based on urgency. For example, if the user sets a 50% remaining threshold and a 10% remaining threshold, an alert associated with falling past the 10% threshold may be more noticeable (e.g., louder, brighter, more persistent) than an alert associated with passing the 50% threshold. In one aspect, alerts may be given within the vehicle, or via the user's remote device, or both.

When the user has finished configuring any selected alerts via the user interface 500, the user may select a field such as the completion field 513. Upon the selection of completion field 513, the parameters entered by the user are stored for use by the alerting application. Triggers to later run the alerting application may include a change of a predetermined increment in location, battery charge, etc.

As noted above, the user may be directed to geo-coded charging stations in certain circumstances. Although any method of generating a list of charging stations and their locations and capabilities may be used, in one aspect, the locations and capabilities of charging stations are learned by the system as such stations are used. Thus, once it is detected that charging is occurring, the system also determines the duration of the charge action and the location of the charging facility. This data collection may be made by the telematics unit 214 in concert with the charge controller 221 or otherwise as appropriate.

It will be appreciated that the described system allows the user to operate his or her vehicle in a more economical fashion by ensuring timely and cost effective charging, and also allows the user to more readily observe the operating cost differential between different proportions of electric-only use. It will also be appreciated, however, that the foregoing methods and implementations are merely examples of the inventive principles, and that these illustrate only preferred techniques.

It is thus contemplated that other implementations of the invention may differ in detail from foregoing examples. As such, all references to the invention are intended to reference the particular example of the invention being discussed at that point in the description and are not intended to imply any limitation as to the scope of the invention more generally. All language of distinction and disparagement with respect to certain features is intended to indicate a lack of preference for those features, but not to exclude such from the scope of the invention entirely unless otherwise indicated.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A system for providing instructions to a user of an electric vehicle to improve electric driving range, the system comprising:

an electrical energy storage system within the vehicle so as to receive an indication of a charge state of the electrical energy storage system; and a controller for analyzing a charge state of the electrical energy storage system and for providing user instructions related to charging the electrical energy storage system, wherein the controller is adapted to estimate an expected amount of vehicle use within a forward-looking time window, analyze the charge state of the electrical energy storage system to determine whether sufficient charge remains for the expected amount of vehicle use within a forward-looking time window and to alert the user of a proximate charging station if sufficient charge does not remain in the electrical energy storage system for the expected amount of vehicle use within a forward-looking time window.

2. The system for providing instructions according to claim 1, wherein the controller is adapted to estimate expected travel by analyzing historical driving patterns of the user.

3. The system for providing instructions according to claim 1, wherein the controller is adapted to estimate expected travel by further retrieving and analyzing contents of an electronic calendar stored by the user.

4. The system for providing instructions according to claim 1, wherein the controller is further adapted to estimate a current local cost of electricity prior to alerting the user of a proximate charging station.

5. The system for providing instructions according to claim 1, wherein, to determine whether sufficient charge remains for the expected travel, the controller is further adapted to estimate a travel distance and type associated with the expected travel.

6. The system for providing instructions according to claim 1, wherein the controller is further adapted to determine that the nearest charging station lies within a predetermined proximity prior to alerting the user.

7. The system for providing instructions according to claim 1, wherein the controller is further adapted to determine that the charge state of the electrical energy storage system has fallen below a predetermined threshold prior to alerting the user.

8. The system for providing instructions according to claim 1, wherein the user instructions include instructions for the user to modify a driving route associated with the expected travel.

9. A method of assisting a user in maintaining a charge state in an on-board battery associated with an electric vehicle, the method comprising:

recording user driving patterns as they occur;

accessing recorded driving patterns to obtain a first estimate of expected upcoming travel;

accessing an electronic calendar associated with the user having stored thereon data pertaining to driving events to obtain a second estimate of expected upcoming travel;

generating a final estimate of expected upcoming vehicle use based on the first and second estimates;

deriving an estimate of vehicle charge needs based on the final estimate of expected upcoming travel; and providing a user instruction set having instructions for charging the on-board battery associated with the electric vehicle in keeping with the derived estimate of vehicle charge needs.

10. The method of assisting a user in maintaining a charge state in an on-board battery according to claim 9, wherein the first and second estimates of expected upcoming travel and the final estimate of expected upcoming travel include travel expected to occur with a forward-looking time window.

11. The method of assisting a user in maintaining a charge state in an on-board battery according to claim 10, wherein the forward-looking time window has a duration of 24 hours.

12. The method of assisting a user in maintaining a charge state in an on-board battery according to claim 9, wherein selecting one of the first and second estimates as a final estimate of expected upcoming travel includes selecting the first estimate if the calendar does not indicate travel, and selecting the second estimate if the calendar does indicate travel.

13. The method of assisting a user in maintaining a charge state in an on-board battery according to claim 9, wherein deriving an estimate of vehicle charge needs based on the final estimate of expected upcoming travel includes determining a distance and driving type associated with the final estimate of expected upcoming travel and deriving an estimate of vehicle charge needs based on the distance and driving type associated with the final estimate.

14. The method of assisting a user in maintaining a charge state in an on-board battery according to claim 9, wherein the user instruction set further includes instructions for modifying a driving route associated with the final estimate of expected upcoming travel.

15. The method of assisting a user in maintaining a charge state in an on-board battery according to claim 9, wherein the user instruction set is conveyed audibly to the user in the vehicle.

16. The method of assisting a user in maintaining a charge state in an on-board battery according to claim 9, wherein the user instruction set is conveyed visually to the user in the vehicle.

17. The method of assisting a user in maintaining a charge state in an on-board battery according to claim 9, wherein the user instruction set is conveyed to the user at an electronic device remote from the electric vehicle.

18. The method of assisting a user in maintaining a charge state in an on-board battery according to claim 9, wherein deriving an estimate of vehicle charge needs includes determining whether the charge state of the on-board battery has fallen below a user-specified threshold.

\* \* \* \* \*